United States Patent [19]

Wheeler et al.

[11] 4,221,702
[45] Sep. 9, 1980

[54] 9-THIABICYCLO [3,3,1] NONANEDIYL-2,6-BIS[3-(3,5-DI-TERT-BUTYL-4-HYDROXYPHENYL) PROPIONATE]

[75] Inventors: Edward L. Wheeler, Watertown; Elmar H. Jancis, Naugatuck, both of Conn.

[73] Assignee: Uniroyal, Inc., New York, N.Y.

[21] Appl. No.: 68,236

[22] Filed: Aug. 20, 1979

[51] Int. Cl.² ............... C08K 5/45; C07D 335/00
[52] U.S. Cl. ............ 260/45.8 RW; 260/45.85 B; 260/398.5; 549/9; 549/51
[58] Field of Search .................. 549/9, 49, 51; 260/45.8 RW, 398.5, 45.85 S

[56] References Cited
U.S. PATENT DOCUMENTS

| | | | |
|---|---|---|---|
| 4,000,112 | 12/1976 | Stephen | 260/45.8 RW |
| 4,000,113 | 12/1976 | Stephen | 260/45.8 N |
| 4,132,702 | 1/1979 | Schmidt | 260/45.8 RW |

*Primary Examiner*—V. P. Hoke
*Attorney, Agent, or Firm*—Norbert P. Holler; Paul H. Ginsburg

[57] ABSTRACT

A compound of the formula

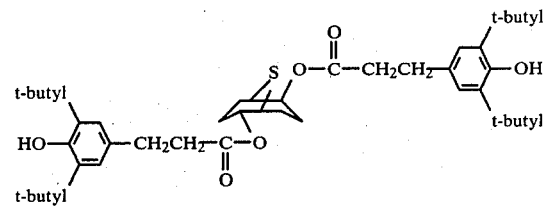

is useful in protecting organic materials normally subject to oxidative degradation. Among the products benefiting from the incorporation of this phenolic antioxidant are synthetic and natural rubbers, petroleum products and plastics.

10 Claims, No Drawings

9-THIABICYCLO [3,3,1] NONANEDIYL-2,6-BIS[3-(3,5-DI-TERT-BUTYL-4-HYDROXYPHENYL) PROPIONATE]

BACKGROUND OF THE INVENTION

The present invention relates to a phenolic compound useful in protecting organic materials normally subject to oxidative degradation. U.S. Pat. No. 4,000,113 (Stephen I) claims the following compounds:

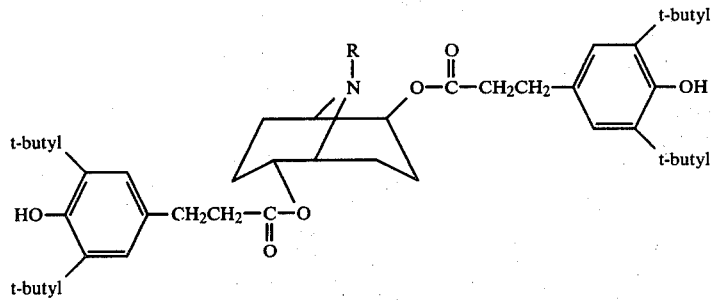

The compounds of Stephen I differ from the compound of the present invention by the hereto atom used in the ring. U.S. Pat. No. 4,000,112 (Stephen II) discloses compounds of the formula

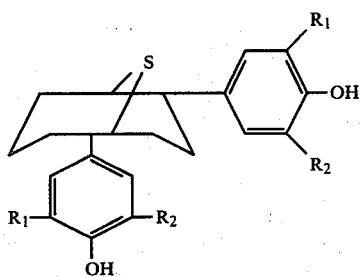

The compounds of Stephen II differ from the compound of the present invention by the manner in which the phenolic ring is attached to the bicyclic ring.

SUMMARY OF THE INVENTION

The present invention relates to a compound of the formula

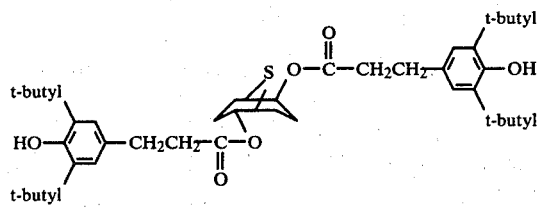

and to compositions of matter comprising an organic material normally subject to oxidative degradation and a stabilizing amount of said compound.

DESCRIPTION OF THE PREFERRED EMBODIMENTS

The compound of the present invention is useful in stabilizing organic materials normally subject to oxidative degradation. Materials that are thus stabilized include a multitude of synthetic polymers. Among those polymers are various polyolefins such as polyethylene, polypropylene, polybutylene, polybutadiene and polymethylpentene. Other polymers stabilized by the compound of the present invention include acetal resins, polyacrylates, polymethacrylates, polydialkylpthalate, cellulosics, polyamides, polyesters, polyurethanes, polycarbonate, polystyrene, polyvinyl chloride, and polyvinylidene chloride. Copolymers can also be stabilized by the compound of the present invention. Representative copolymers include ethylene/vinyl acetate copolymers, and ethylene/ethyl acrylate copolymers.

Copolymers also include terpolymers such as ethylene/propylene terpolymers (these terpolymers are preferably ethylene, propylene, non-conjugated diene copolymers) and acrylonitrile/butadiene/styrene copolymer. Polymer blends such as polystyrene/polyphenylene oxide and ethylenepropylene copolymer/polypropylene can also be stabilized by the compound of the present invention. Other materials stabilized by the compound of the present invention include hot melt adhesives such as those based on polyesters, polyamides or ethylene/vinyl acetate. Also stabilized are petroleum products such as fuels, lubricating oils and petrolatum jellies and natural products such as natural rubber, waxes, fat, tallow, linseed oil, corn oil, cottonseed oil and codliver oil.

The preceding list is representative, though by no means exhaustive, of the products that can benefit from the compound of the present invention. To achieve protection against oxidative degradation, the compound of the present invention is added in the usual amounts to achieve such protection. Depending on the substrate used, the antioxidant is preferably added in amounts of 0.001 to 10% by weight based on the weight of the substrate, with the more usual range being from 0.05 to 2.0% by weight.

The compound of the present invention can be used by itself to stabilize organic materials, or it can be used in combination with other stabilizers. Such other stabilizers might include other phenolics, thio compounds of various kinds, such as thiodipropionate esters, phosphites and phosphonates, anticopper chemicals such as oxalamides, ultraviolet stabilizers of various kinds as well as other additives where the use of such additives has been found to be beneficial.

The compound of this invention can be made very conveniently from 2,6-dichloro-9-thiabicyclo[3,3,1]nonane and the sodium salt of 3(3,5-di-tert-butyl-4-hydroxyphenyl)propionic acid. The 2,6-dichloro-9-thiabicyclo[3,3,1]nonane has been previously described by Weil, Smith, and Gruber in J. Org. Chem., 31, 1674 (1966). The 3(3,5-di-tert-butyl-4-hydroxphenyl)propionic acid has been described by Belostotskaya and Ershow; Izv.

Akad. Nauk. SSSR, Ser. Khim., 1964, 765–767. The reaction proceeds best in an aprotic polar medium.

Other methods, such as straightforward esterification procedures, will readily suggest themselves to those skilled in the art.

The following non-limiting examples illustrate the practice of the present invention:

EXAMPLE 1

Preparation of 9-Thiabicyclo[3,3,1]nonanediyl-2,6-Bis[3-(3,5-di-tert-butyl-4-hydroxyphenyl)propionate]

To a mixture of 40 g sodium 3(3,5-di-tert-butyl-4-hydroxyphenyl)propionate in 100 ml dimethylsulfoxide was added 10 g of 2,6-dichloro-9-thia-bicyclo[3,3,1]nonane in 30 ml dimethylsulfoxide. The mixture was heated for one hour at 60° C. and was then poured into water. The resulting precipitate was filtered, washed with water and recrystallized from ethanol. The title compound thus obtained melted at 117°–120° C. The product was further purified by passing it through a silica gel column, using a toluene/hexane (1:1) mixture as the eluent. On removal of the eluent, the product melted at 125°–126° C.

EXAMPLE 2

This example shows the superiority of the compound of the present invention (referred to in Table 1 and in Table 2 as "this invention") over the thio compound described in U.S. Pat. No. 4,000,112, Example 1 and also shows the beneficial effect of a co-stabilizer in polypropylene.

The stabilizers were incorporated into polypropylene resin on a mill at 330° F. (165° C.). Seventy-five mil (1.9 mm) plaques were prepared by compression molding in a press at 27,000 psi (186 MPa) and 350° F. (177° C.). Buttons were punched from these plaques. These specimens were then exposed in a forced air over at 300° F. (149° C.) and the number of days to embrittlement were noted.

TABLE 1

| Stabilizer | % Level*** | Days to Failure |
|---|---|---|
| none | — | 1 |
| comparison compound* | 0.2 | 57 |
| this invention | 0.2 | 79 |
| DSTDP** | 0.2 | 4 |
| this invention/DSTDP | 0.1/0.1 | 91 |

*2,6-Bis (3,5-di-tert-butyl-4-hydroxyphenyl)-9-thiabicyclo[3,3,1]nonane
**distearyl thiodipropionate
***percent by weight, based on the weight of the resin

EXAMPLE 3

This example shows the superiority of the compound of the present invention over the compound described in U.S. Pat. No. 4,000,113, Example 14, in an ethylene/propylene terpolymer.

The stabilizers were dissolved in a rubber cement, containing about 110 g of ethylene/propylene/ethylidenenorbornene terpolymer having an ethylene/propylene weight ratio of 53/47, an iodine number of 8 and a Mooney viscosity (ML-4) of 58 at 125° C., dissolved in 2,000 g of hexane. Thereafter, 0.15 parts per 100 parts of polymer, by weight, of the stabilizers listed below were added. The hexane was removed by slowly adding the cement to boiling water. The rubber blend was dried on a mill for 5 minutes at a temperature of 135°–150° C. Samples were tested by measuring the time, in minutes, required to absorb 20 cc of oxygen at 150° C. (Time $_{20}$). The results are shown Table 2.

TABLE 2

| Stabilizer | Time$_{20}$ |
|---|---|
| none | 6 |
| this invention | 150 |
| comparison compound* | 31 |

*2,6-bis 3(3,5-di-tert-butyl-4-hydroxyphenyl propionyloxy-9-methyl-9-azabicyclo[3,3,1]nonane

EXAMPLE 4

This example shows the usefulness of the compound of the present invention in a polypropylene/ethylene-propylene terpolymer blend.

The compound was milled into a polypropylene/ethylenepropylene terpolymer blend at a concentration of 0.3 parts by weight per hundred parts by weight of terpolymer blend. Seventy-five mil plaques were compression molded and buttons were punched from these plaques. The buttons were exposed to a forced air oven at 300° F. (199° C.) and the time for three of five buttons to embrittle was noted.

| Additive | % Level | Hours to Failure |
|---|---|---|
| none | — | 80 |
| this invention | 0.3 | 310 |

We claim:
1. 9-Thiabicyclo[3.3.1]nonanediyl-2,6-bis[3-(3,5-di-tert-butyl-4-hydroxyphenyl)propionate].
2. A composition comprising an organic material normally subject to oxidative deterioration and a stabilizing amount of the compound of claim 1.
3. A composition according to claim 2 wherein said organic material is a polyolefin.
4. A composition according to claim 2 wherein said organic material is polypropylene.
5. A composition according to claim 4 wherein a dialkyl thiodipropionate is used as a co-stabilizer.
6. A composition according to claim 2 wherein said organic material is polyethylene.
7. A composition according to claim 2 wherein said organic material is an ethylene/propylene copolymer.
8. A composition according to claim 2 wherein said organic material is an ethylene/propylene terpolymer.
9. A composition according to claim 2 wherein said organic material is polystyrene or high impact polystyrene.
10. A composition according to claim 2 wherein said organic material is a mixture of polypropylene and an ethylene/propylene terpolymer.

* * * * *